Patented July 20, 1926.

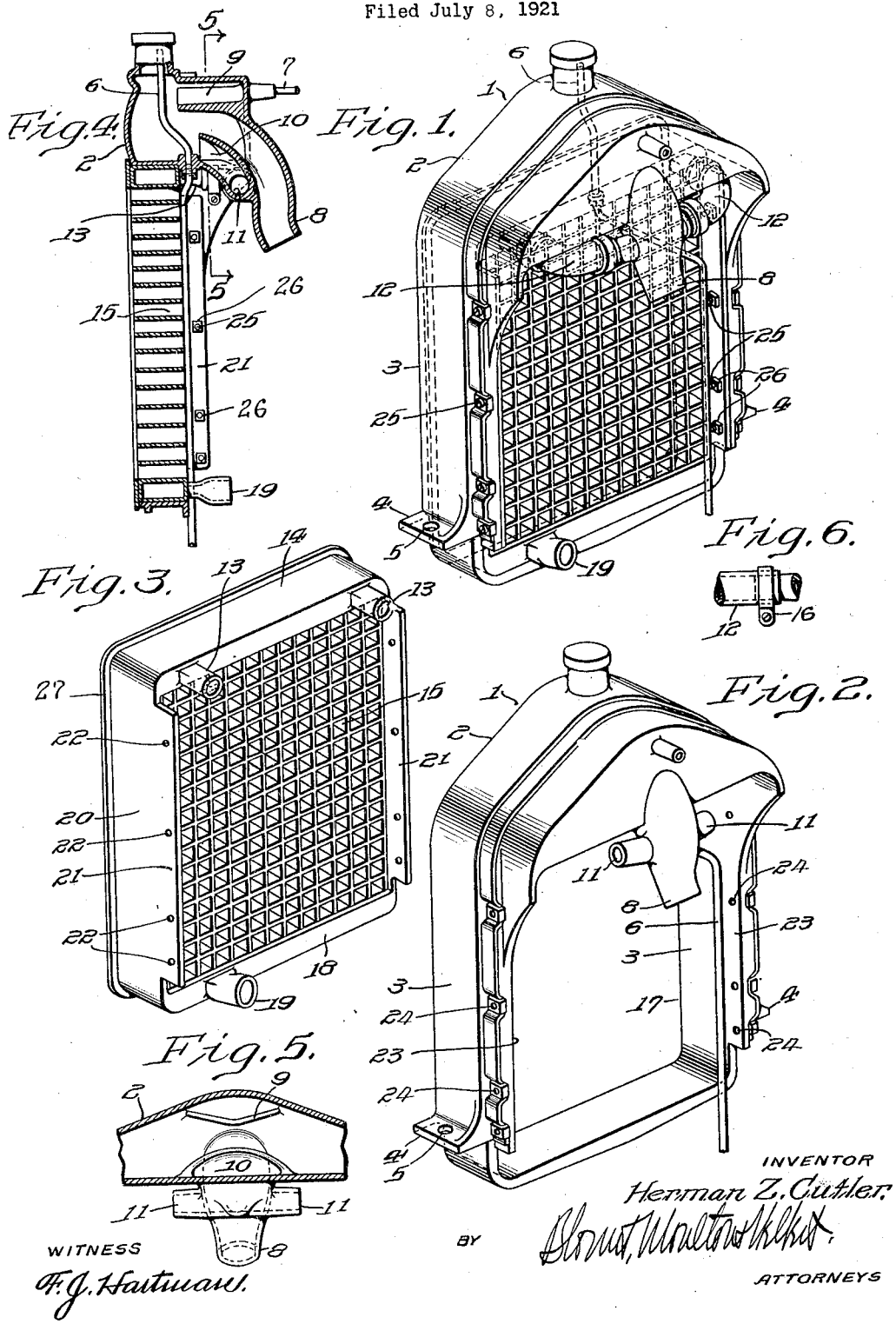

1,593,243

UNITED STATES PATENT OFFICE.

HERMAN Z. CUTLER, OF CAMDEN, NEW JERSEY.

AUTOMOBILE RADIATOR.

Application filed July 8, 1921. Serial No. 483,121.

A principal object of my invention is to provide a radiator for automobiles in which the core is readily removable from its outer frame or casing for repair or replacement.

A further object of my invention is to provide a circulatory water system for an automobile radiator, particularly adapted for those automobiles in which a water circulating pump may be dispensed with.

A still further object of my invention is to provide a new and improved form of water inlet and outlet for an automobile radiator.

A still further object of my invention is to provide a deflector of such form and so positioned within the radiator of an automobile as to cause the heated water coming from the engine of the automobile to be thrown first towards the sides of the radiator and of the receiving tank and away from the outlet of the tank, thereby assisting in the cooling of the water before it is fed back to the engine.

A still further object of my invention is to provide an automobile radiator in which the lower or receiving tank is contained within a removable core.

My invention further includes all of the other various objects and novel features of construction and arrangement hereinafter more definitely specified and described.

In the accompanying drawing I have illustrated one embodiment of my invention as applied to an automobile radiator in which the core is of the well-known honeycomb construction, the embodiment shown being of a construction and design suitable to replace corresponding parts with which a Ford automobile is usually equipped.

In the said drawing, Figure 1 is a rear perspective view of the invention with the several parts in assembled position; Fig. 2 is a similar view of the shell or casing with the core shown in perspective in Fig. 3 removed therefrom; Fig. 4 is a central vertical section of the assembled radiator shown in Fig. 1; Fig. 5 is a section on line 5—5 of Fig. 4 and Fig. 6 is a fragmentary side elevation of one of the flexible water connections which are preferably used between the shell and the core.

The outer casing or shell 1 is preferably made of cast metal, such as aluminum or other suitable metal, as an integral unit and having in its upper portion a tank 2 extending transversely across the casing. The vertical sides 3 of the casing are provided with lugs 4 having holes 5 through which bolts may be passed to attach the casing to the automobile frame in a usual manner. An overflow pipe 6 communicates with the tank 2 and a brace rod 7 is provided for supporting the automobile hood.

An inlet pipe 8 connected with the automobile engine communicates with tank 2 and is adapted to discharge the water upwardly against a deflector 9 which, as shown, presents a substantially convex surface to the water as discharged thereby deflecting the water towards the sides of the radiator. The outlet pipe or conduit 10 conducts the water from the tank 2 into branch outlets 11, whence it flows through flexible connections 12 into inlets 13 to the header tank 14 of the radiator core 15. The flexible connections 12 may consist of flexible tubing or hose conveniently held in position by hose clamps 16 or in any other suitable manner.

The core 15, which is preferably unitary, may be of any type suitable for effecting the cooling of the water in the radiator and of such shape as to generally conform to the opening 17 of the casing, the form illustrated being of the well-known honeycomb construction comprising a plurality of horizontally and vertically extending sheets of thin metal positioned closely together and providing numerous small passages through which the water circulates during the cooling operation. At the bottom of the radiator core is provided a header tank 18 which is provided with a water connection 19 connected with the engine of the automobile. The upper and lower surfaces of the metal from which the header tanks 14 and 18 are formed, join vertically extending sides 20 of the core which are preferably extended rearwardly somewhat beyond the rear face of the portion 15 to form flanges 21 provided with bolt holes 22.

For securing the core in assembled position within the shell or casing I provide the shell with a pair of rearwardly projecting flanges 23 provided with bolt holes 24 adapted to register with the holes 22. Through the holes 24 and 22 are passed bolts 25 which are secured in position by nuts 26.

I preferably provide the front of the core with a peripheral outwardly extending flange 27, which, when the core is assembled in the casing, rests adjacent the front of the casing concealing the joint between the parts, as best shown in Fig. 4.

I have found that by my improved form of inlet pipe or conduit 8 a thorough circulation of water from the engine to the radiator core is secured. In those cooling systems wherein there is no water circulating pump, the circulation of the cooling fluid is produced by the heating and cooling of the said fluid. The hot water coming from the engine is lighter than the cooler water leaving the radiator and the speed of the movement of the cooling system depends upon the amount or extent to which the temperature is reduced by the radiator. If, therefore, the water entering the tank 2 were to be permitted to flow directly back into the outlet 10, the water at the center or middle of the tank would be hot while the water at the ends or sides of the tank would be cooler, more or less stagnant, and inoperative and substantially reduce the temperature of the incoming hot water.

By causing the incoming hot water to circulate in the tank from the inlet in the middle of the tank outwardly to the sides of the tank and then back to the outlet 10, a substantial reduction of the temperature of the water is obtained in the tank and the water entering the outlet in the tank is cooler than it is when it is not required to circulate back and forth in the tank. The action of the radiator core is to further cool the water. It will therefore be plain that when the temperature of the water is substantially reduced in the tank by the circulation thereof caused by the deflectors 9, the difference between the temperature of the water entering the tank and that leaving the core will be greater than when the hot water passes substantially immediately out of the tank and the speed of the flow of the water in the circulatory system is thus substantially increased.

It will also be seen that I have provided a radiator which may be designed and constructed to conform to those used in standard types of automobiles, and which may be carried in stock by the dealer and used to replace, temporarily or permanently, damaged or worn out corresponding parts.

Repairing of the core of my improved radiator may be efficiently and rapidly done by reason of its easy removability from the casing and replacement therein. This may be done, as will be readily understood, by removing the bolts 25 and disconnecting the water connections with the engine whereupon the entire core may be withdrawn from the casing, its replacement being correspondingly easy.

While I have found that the casing of my invention may be cast as an integral unit, it will be understood that it may be formed by other methods, for example by forming the same from sheet metal, or by forming the same with a number of cast or stamped sections suitably joined together.

It will be understood that variations and changes in the details of construction, arrangement and location of parts would readily suggest themselves to persons skilled in the art and fall within the spirit and scope of my invention. I do not desire, therefore, to be limited or restricted to the exact details of construction and arrangement shown and described.

Having thus described my invention, I claim and desire to protect by Letters Patent of the United States:

1. An automobile radiator comprising a casing having an opening, a tank within said casing, a removable core positioned within said opening, a separable water connection between the core and the tank, an outlet from said tank to said water connection, an inlet to the tank directly over said outlet, and a deflector adapted to deflect water from the inlet towards the sides of the radiator before it flows out of said outlet.

2. An automobile radiator comprising a casing having an opening, a tank within said casing, a removable core positioned within said opening, a separable water connection between the core and the tank, an outlet from said tank to said water connection, an inlet to the tank directly over said outlet and a deflector having a substantially convex surface against which water from the inlet is discharged and by which the incoming water is deflected to the sides of the tank before it flows out of said outlet.

3. An automobile radiator comprising a casing having an opening, a tank within said casing, a core positioned within said opening, a water connection between the core and the tank, an inlet to the tank immediately over the point where said water connection communicates with said tank, a deflector adapted to deflect water from the inlet towards the sides of the radiator, and an outlet from the core to the engine of the automobile.

4. An automobile radiator comprising a casing having an opening, a tank within said casing, a core supported within said casing, an inlet to said tank an outlet from the tank immediately under said inlet and having branch connections with the core, and a deflector adapted to deflect water from the inlet towards the sides of the radiator and away from said outlet.

5. In an automobile radiator, a tank, a core, and a water connection comprising an inlet duct to the tank, an outlet duct therefrom, and a pair of oppositely disposed branch conduits each branch leading from the outlet duct to the core and connecting the said outlet duct to said core.

In witness whereof I have hereunto set my hand this 7th day of July, A. D. 1921.

HERMAN Z. CUTLER.